United States Patent

Simpson

[11] Patent Number: 5,951,423
[45] Date of Patent: Sep. 14, 1999

[54] MECHANICAL FRICTION TENSIONER

[75] Inventor: Roger T. Simpson, Ithaca, N.Y.

[73] Assignee: Borg-Warner Automotive, Inc., Troy, Mich.

[21] Appl. No.: 08/947,060

[22] Filed: Oct. 8, 1997

[51] Int. Cl.⁶ .............. F16H 7/08; F16H 7/22; F16H 7/12
[52] U.S. Cl. .......... 474/109; 474/111; 474/138
[58] Field of Search ............ 474/109, 111, 474/138

[56] References Cited

U.S. PATENT DOCUMENTS

| | | | |
|---|---|---|---|
| 2,963,918 | 12/1960 | Blakstad | 474/111 |
| 4,285,676 | 8/1981 | Kraft | 474/135 |
| 4,457,741 | 7/1984 | Hoeptner, III | 474/138 |
| 4,472,161 | 9/1984 | Ojima | 474/111 |
| 4,509,935 | 4/1985 | Foster et al. | 474/135 |
| 4,696,664 | 9/1987 | Wilson | 474/138 |
| 4,828,536 | 5/1989 | Ampferer | 474/111 |
| 4,934,984 | 6/1990 | Ojima | 474/111 |
| 5,109,813 | 5/1992 | Trzmiel et al. | 474/111 |
| 5,117,786 | 6/1992 | Trzmiel et al. | 474/111 |
| 5,197,420 | 3/1993 | Arnold et al. | 474/111 |
| 5,246,404 | 9/1993 | Ojima | 474/111 |
| 5,277,666 | 1/1994 | Kumm | 474/133 |
| 5,318,397 | 6/1994 | Junkers | 411/432 |
| 5,323,739 | 6/1994 | Mollers | 474/111 |
| 5,439,420 | 8/1995 | Meckstroth et al. | 474/133 |
| 5,597,367 | 1/1997 | Trzmiel et al. | 474/111 |
| 5,606,941 | 3/1997 | Trzmiel et al. | 474/111 |
| 5,720,683 | 2/1998 | Patton | 474/138 |
| 5,797,817 | 8/1998 | Senftleben et al. | 474/138 |

FOREIGN PATENT DOCUMENTS 4203449  8/1993  Germany.

OTHER PUBLICATIONS

European Search report, EP 98 30 8037, dated Feb. 4, 1999.

Primary Examiner—Tamara L. Graysay
Assistant Examiner—Matthew A. Kaness
Attorney, Agent, or Firm—Sidley & Austin; Greg Dziegielewski

[57] ABSTRACT

A mechanical friction tensioner for power transmission chains, such as engine timing chains. The tensioner provides the advantages of a conventional hydraulic tensioner, but eliminates the hydraulic pressure system by use of spring loaded wedge-shaped blocks and friction damping. The mechanical tensioner has a wedge-shaped plunger positioned within a bore in the tensioner housing. The plunger is biased outward by two spring loaded wedge-shaped blocks and a return spring. As the plunger moves inward, the wedge-shaped blocks are pushed in towards the plunger by the springs to provide friction damping.

12 Claims, 6 Drawing Sheets

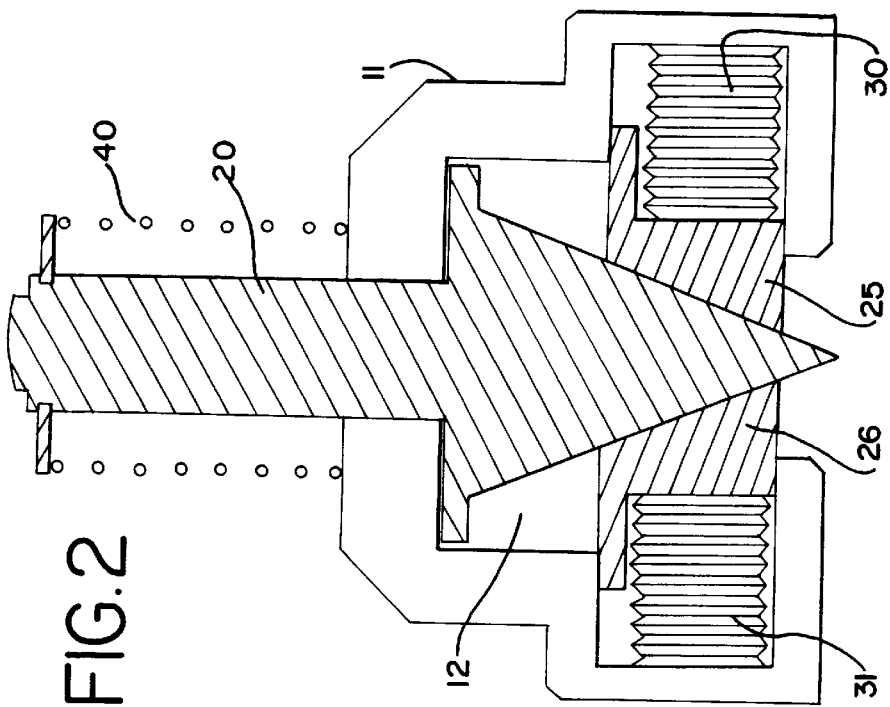
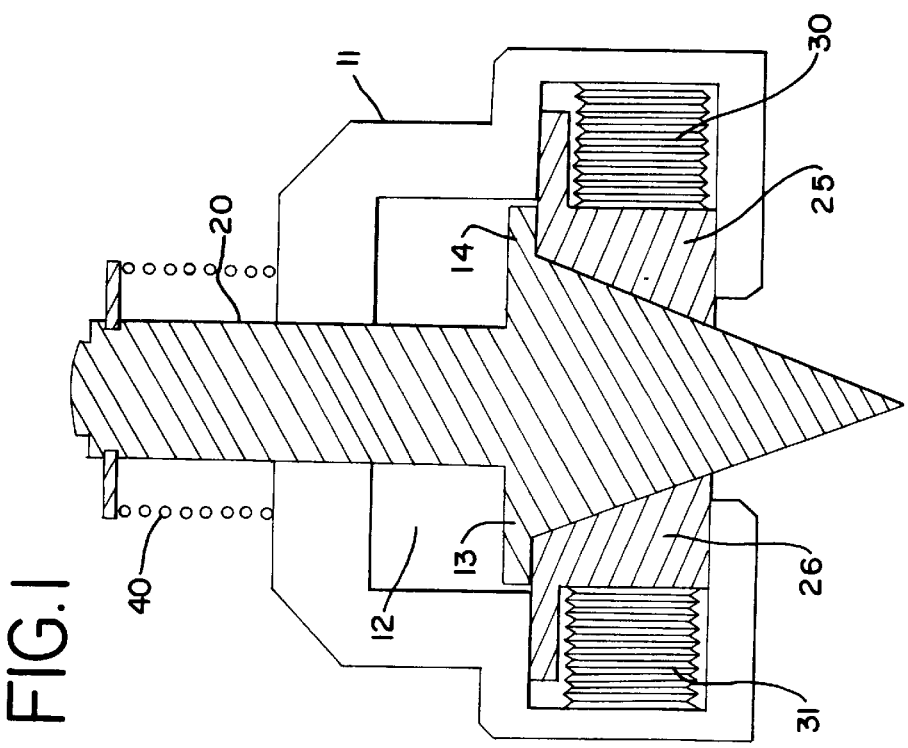

MECHANICAL FRICTION TENSIONER

BACKGROUND OF THE INVENTION

The present invention relates to tensioning devices for timing chains. The tensioner of the present invention provides the advantages of a conventional hydraulic tensioner, but eliminates the hydraulic pressure system by use of spring loaded wedge-shaped blocks and friction. A wedge-shaped plunger pushes on two spring loaded wedge-shaped blocks to maintain the tension on a chain as it slackens.

Tensioners are used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A tensioner is used to take up the slack in the chain or belt that connects the camshafts to the crankshaft of the engine timing system.

Most modern engines use hydraulic tensioners alone or with some type of mechanical rack to hold the position of the piston during start up or while the engine is off. A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction.

As an engine speed increases, the torsional oscillations from the camshaft will cause the chain tension to increase. As the chain wears and stretches, the piston of the hydraulic tensioner protrudes outward to take up the excess chain length. The tension in the chain varies with the engine speed and the tensioner responds by adjusting the position of the piston to maintain chain tension. In a hydraulic tensioner, oil is allowed to flow into the piston as the piston moves outward. The tensioner relies on oil leakage to retract the piston as the speed lowers. A mechanical tensioner avoids the problems associated with maintaining hydraulic pressure in a fluid system.

In one conventional mechanical tensioner, shown in FIG. 4, a round plunger 200 is pushed up by a spring 202. The spring 202 contacts an end piece that is connected to the plunger 200 biasing the plunger 200 in a protruding direction. To prevent the plunger 200 from retracting once it has extended, balls 204 and 206 are spring loaded against the plunger shaft and are wedged between the plunger 200 and the angled surfaces 208 and 210 around the outside of the plunger. Specifically, the balls will stop the plunger because as the plunger retracts, the balls move into the more narrow space between the plunger and the angled surface. When there is no tension in the chain, then the balls will return to their original position because there is no pressure from the plunger. As a result, the plunger will also return to its original start-up position. This tensioner is used primarily for racing engines where camshaft timing is more important than wear on the timing drive components.

Another mechanical tensioning device is described in Kraft, U.S. Pat. No. 4,285,676. In Kraft, a housing is mounted in a fixed position on the vehicle engine adjacent the drive belt. A lever is pivotally mounted on a shaft, which is located within the housing and extends radially outwardly from the housing and is adapted to move in a belt tensioning direction. A first pair of cylindrical, torsional coil springs is mounted on the shaft, with a spring located on each side of the lever. A second pair of cylindrical, torsional coil springs is mounted on the shaft and surrounds the first spring pair. One end of each spring is attached to the housing with the other spring ends attached to the lever. The spring pairs are placed in torsion and bias the lever in the belt tensioning direction. An idler pulley is mounted on the end of the lever and is moved into tensioning engagement with the drive belt by the torsion springs. Alternatively, one of the vehicle accessories is mounted on the end of the lever for tensioning the drive belt engaged by the accessory pulley. The Kraft design avoids the use of a hydraulic system. However, Kraft does not use frictional forces, but rather a spring arrangement with three or more torsional springs.

Similarly, the present invention addresses the problems of wear and constant force on the chain. Instead of a hydraulic chamber, the piston is acted upon by a stacked belleville spring assembly, a return spring located on the outside of the housing, and the friction force between the piston and a pair of wedge-shaped blocks. In the present invention, a wedge-shaped plunger is biased by a return spring and a pair of spring loaded wedge-shaped blocks. This assembly has many advantages over a hydraulic tensioner or the prior art mechanical tensioners. For example, during start-up or hot idling, oil pressure is not present, so a hydraulic tensioner must draw oil in from the engine. If the engine has been off for a long time, the oil is no longer available and the piston will draw in air. The plunger will move in and out and not control the chain. This lack of control can cause start-up noise or the chain may slip a tooth.

In contrast, in the present invention, instead of hydraulic pressure, the plunger angle and friction coefficient control the resistance force against inward movement of the tensioner. The tensioner force pushing the plunger in will not exceed the total force of the return spring, wedge springs, and static friction, so the force on the chain will not exceed the endurance limit. Thus, the tensioner will respond effectively in all conditions. Additionally, the tensioner can be mounted anywhere in the engine, and there is no potential fluid leak down path.

SUMMARY OF THE INVENTION

The present invention is directed to a mechanical chain tensioner having a wedge-shaped plunger that pushes against two spring loaded wedge-shaped blocks to keep a minimal force on a chain as it slackens. "Wedge-shaped" is defined to include any angular shaped, or inclined shaped, piece that provides a sliding contact force with both vertical and horizontal components. Thus, "wedge-shaped" is not limited to the shapes depicted in the drawings, but includes other angular or triangular shapes that provide a resistance force. The tensioner includes a housing with a bore and a plunger slidably received within the bore. The bore has a shape of two hollow rectangular pieces with a smaller piece on top of a larger piece. The smaller piece has a width slightly greater than the plunger, and the larger piece holds the wedge-shaped blocks and their springs. The plunger, or piston, is biased in a protruding direction out of the housing by a return spring located at the top of the plunger, outside of the housing. In another embodiment, the spring is located within the housing.

A mechanical friction tensioner resists the downward force from the chain with a combination of a return spring force, a force from each wedge-shaped block, and frictional forces, rather than a combination of spring force and oil pressure in a hydraulic tensioner. The force required to push the tensioner towards the bore is set by adjusting the plunger angle and the friction coefficient. The use of belleville springs that have a constant force versus displacement curve produces spring forces that are constant at any position. The tensioner will resist increases in chain tension and maintain its position, until the force exceeds the set force. At that point, the plunger will move inward to prevent the tensioner force from increasing above the downward force of the chain. At the same time, the wedge-shaped blocks will move outward towards the outer end of the tensioner and will provide a balanced reaction force.

In one example of the tensioner of the present invention, the plunger pushes against two spring loaded wedge-shaped blocks. The plunger is formed of a long rectangular piece connected to two triangular pieces, opposite one another, at its lower end, and is preferably comprised of powdered metal. The wedge-shaped blocks are rectangular with one side sloped to fit against the triangular sides of the plunger and have a cylindrical opening at the bottom. The wedge-shaped blocks are also comprised of powdered metal. As the plunger protrudes outwardly, the wedge-shaped blocks move in towards the plunger. The wedge springs are preferably stacked belleville washers. In addition to the force from the wedge-shaped blocks pushing against the plunger angle, a return spring pushes the plunger away from the housing as the chain tightens. The spring may be located on top of the housing or within the housing. The inward force of the chain against the plunger is resisted or balanced by the force of the return spring and the force of the spring loaded wedge-shaped blocks against the plunger as applied through frictional resistance.

The tensioner maintains its plunger position with a force of 50 lbs to 175 lbs pushing on the plunger from the chain and then pushes the plunger up with a lower force when the chain slackens to keep a low average force on the chain. The tensioner will resist increases in chain tension as the chain force is balanced by the combination of the return spring force, wedge spring force, and static friction.

In another example of the tensioner, two plunger and wedge assemblies control the tension of a chain operating between two camshafts. The assemblies are separated by a wedge guide so that each operates independently of the other. Each assembly operates similarly to the tensioner described in the first example.

BRIEF DESCRIPTION OF THE DRAWINGS

FIG. 1 is a sectional view of one embodiment of a mechanical tensioner of the present invention.

FIG. 2 is a sectional view of the plunger of the tensioner of FIG. 1 in an extended position.

DETAILED DESCRIPTION OF THE PREFERRED EMBODIMENTS

Figure 3:
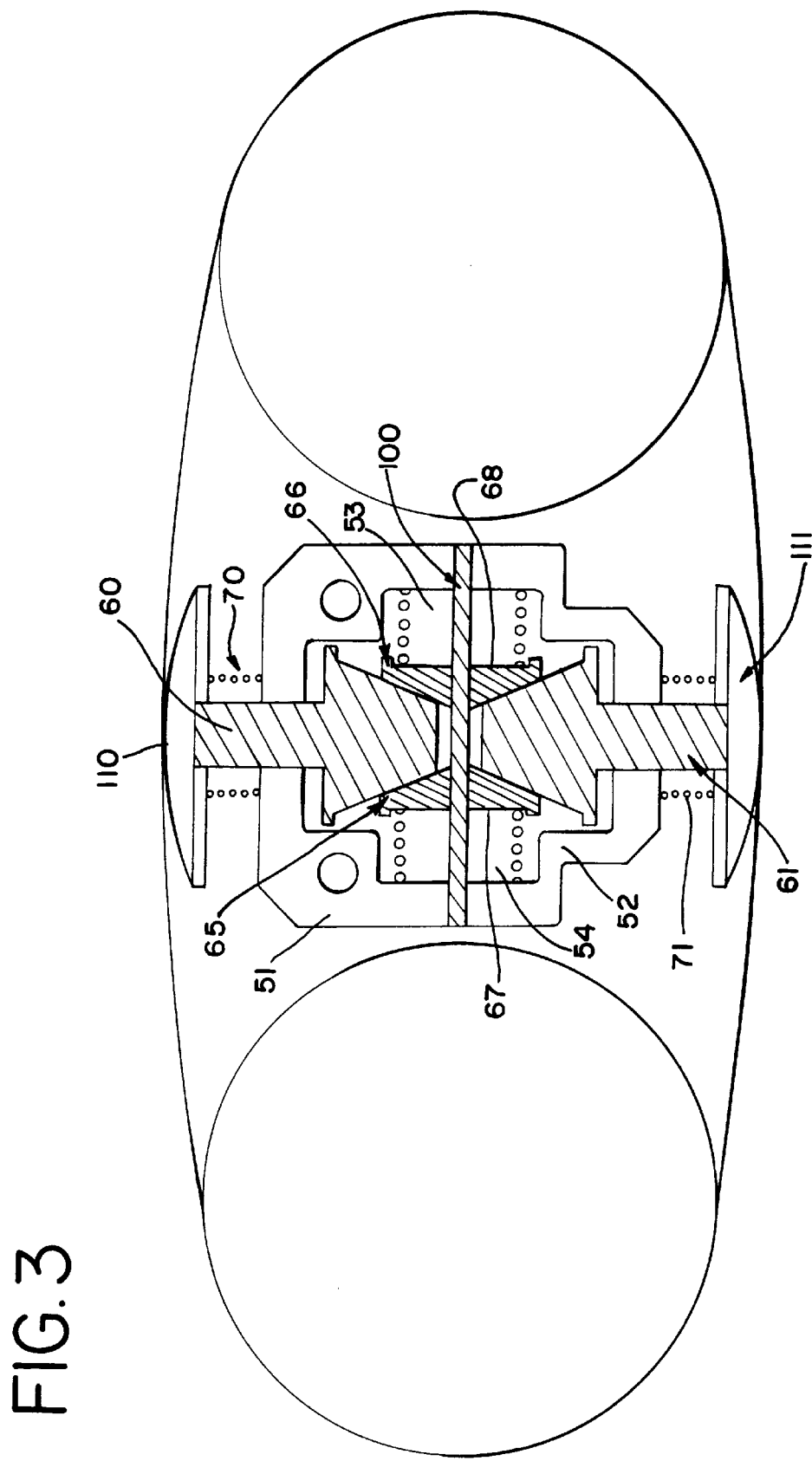
FIG. 3 is a sectional view of another embodiment of a mechanical tensioner of the present invention.
Figure 4:
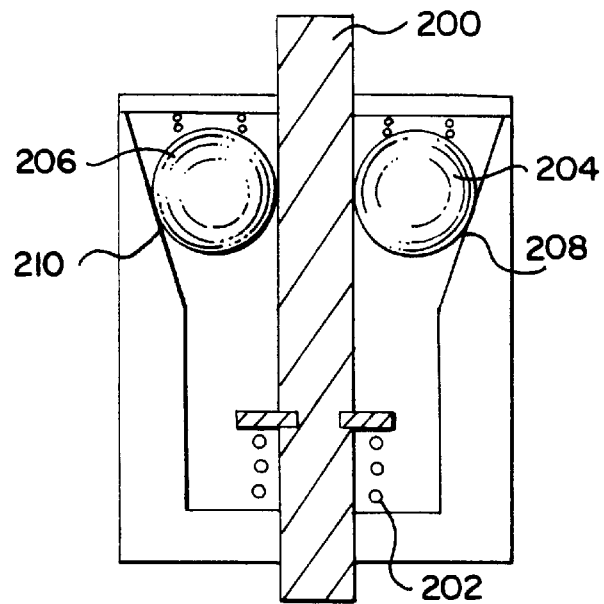
FIG. 4 is a sectional view of a mechanical tensioner of the prior art.

FIG. 1 illustrates the tensioner 10 in its innermost position. The tensioner 10 includes a housing 11 having a bore 12 and a plunger 20 having its lower end in the shape of a wedge. The plunger 20 pushes on two wedge-shaped blocks 25 and 26. The plunger 20 and wedge-shaped blocks 25 and 26 are both preferably made of powdered metal. The wedge-shaped blocks 25 and 26 are biased inward, toward one another, by springs 30 and 31, respectively. Stacked belleville washers may be used so that the springs 30 and 31 have a near constant force with displacement. As the plunger 20 protrudes outwardly against an arm (not shown), the wedge-shaped blocks 25 and 26 move in towards the plunger 20. Extending arms 13 and 14 prevent the plunger 20 from moving outward beyond the top of the inside of housing 11. The inward movement of the tensioner plunger 20 from the force of the chain is balanced or resisted by the frictional force created by the wedge-shaped blocks 25 and 26 pushing against the plunger 20 and the force of a return spring 40 used to push the plunger 20 away from the housing 11 as the chain tightens.

FIG. 2 illustrates the tensioner 10 in its outermost position. In conventional hydraulic tensioners, the force pushing the plunger out is a combination of spring force and oil pressure force ranging from 15 pounds at idle to 70 pounds at high engine speed. The mechanical tensioner 10 maintains the plunger position with a force of 50 lbs to 175 lbs provided by the wedge springs 30 and 31 creating a friction force. This constant force pushes on the plunger 20 and will move the plunger 20 outward when the chain slackens to maintain an average force on the chain.

The behavior of the tensioner 10 is modified or set by adjusting the plunger angle and the friction coefficient and belleville spring force. The tensioner 10 responds effectively in all conditions. Specifically, the tensioner 10 will balance increases in chain tension by increases in the force combination of the return spring force, wedge spring force, and static and dynamic friction. As chain force increases, the plunger 20 will move inward to balance the tensioner plunger force and the downward force. The wedge-shaped blocks 25 and 26 will also move outward towards the outer end of the housing 11. As a result, the endurance limit of the tensioner will not be exceeded.

As the engine speed decreases and chain force decreases, the plunger 20 will move outward. The friction force between the wedge-shaped blocks 25 and 26 and the plunger 20 includes both dynamic and static components, where the static coefficient of friction is greater than the dynamic coefficient of friction. At the high engine speed, the duration of torque pulses are short, so the tensioner 10 operates in the static portion on a friction curve and never reaches the dynamic coefficient region of the curve. At lower speeds, the torque pulses are longer, so the plunger 20 extends as the chain loads are lower. The tensioner 10 has a relatively flat force versus displacement curve in the down or inward direction. The change of the effective friction from a static to a dynamic condition means the plunger 20 is able to react to the changing loads of the engine timing system. As shown in FIG. 1, the plunger 20 reaches a maximum inward position when the plunger arms 13 and 14 contact the wedge-shaped blocks 25 and 26.

Figure 6:
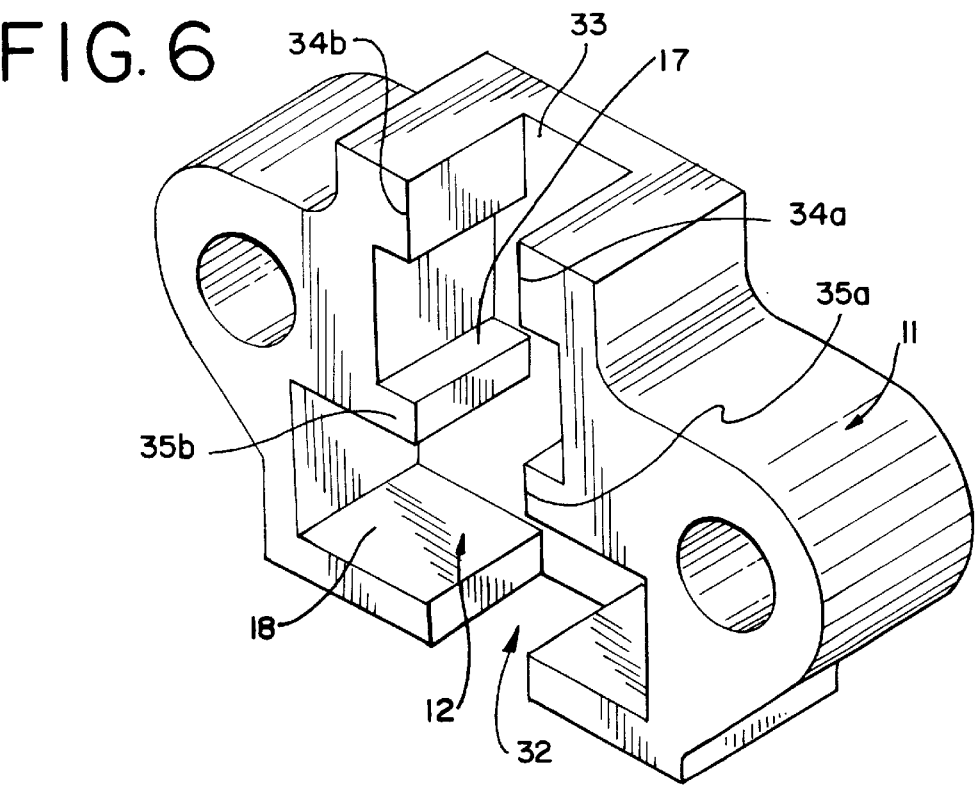
FIG. 6 is a perspective view of the housing of the tensioner.

FIG. 6 illustrates the housing 11 and the bore 12 having two hollow pieces in the shape of rectangles with a smaller piece 17 on top of a larger piece 18. The larger piece 18 holds the wedge springs, wedge-shaped blocks and the wedge of the plunger, where the bottom of the wedge extends outside of the housing 11 through a bottom opening 32. The smaller piece 17 holds the return spring and plunger, where the top of the plunger extends out of the smaller piece through an upper opening 33. The extending arms of the plunger move within the smaller piece 17, where the top extensions 34a and 34b of the smaller piece and the bottom extensions 35a and 35b of the smaller piece prevent the extending arms from moving outside of the smaller piece 17.

Figure 5:
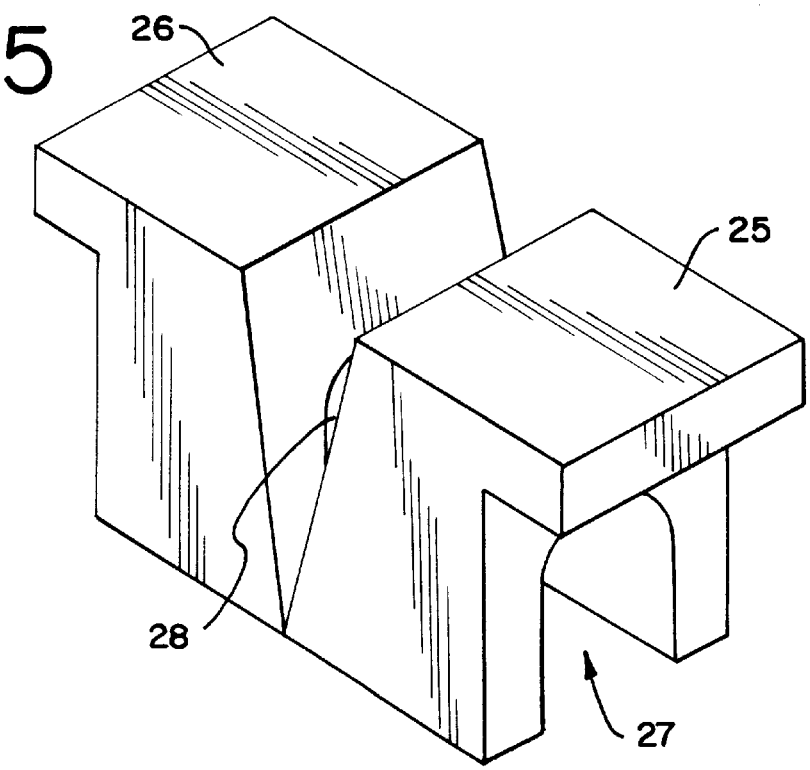
FIG. 5 is a perspective view of the pair of wedge-shaped blocks.
Figure 7:
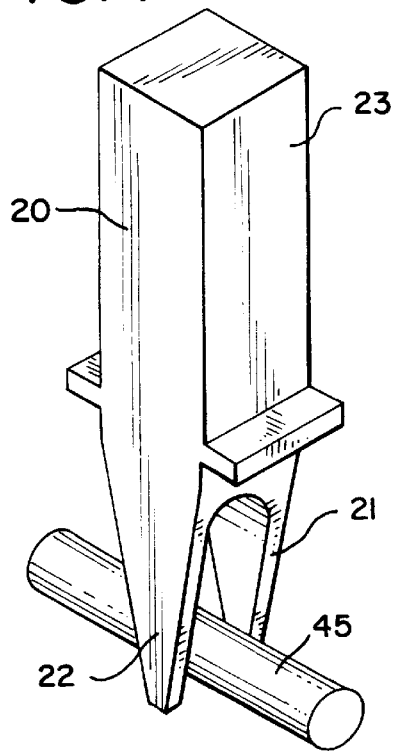
FIG. 7 is a perspective view of the plunger with a wedge guide.

FIG. 7 shows the plunger 20 having a long rectangular piece 23 connected to two triangular pieces 21 and 22, opposite one another, at its lower end. The wedge-shaped blocks 25 and 26, shown in FIG. 5, having a cylindrical opening at the bottom and a rectangular shape with one side sloped, contact the sides of the triangular pieces 21 and 22, respectively, of the plunger. FIG. 7 also shows the wedge guide 45 that stops the plunger 20 from being forced too far into the housing 11. The wedge guide 45 also horizontally guides the wedge-shaped blocks 25 and 26, where each wedge-shaped block's opening, 27 and 28, respectively, contact the wedge guide 45.

In a second embodiment of this invention, shown in FIG. 3, the tensioner 50 includes a top housing 51 and a bottom housing 52, each having a bore 53 and 54, respectively, and a top plunger 60 and a bottom plunger 61, each having a lower end in the shape of a wedge that operates between two strands of a chain drive. The plunger 60 pushes on a pair of spring loaded wedge-shaped blocks 65 and 66, while plunger 61 pushes on a pair of spring loaded wedge-shaped blocks 67 and 68. As the plungers 60 and 61 protrude outwardly, their respective wedge-shaped blocks move in towards the plungers 60 and 61. Extending arms 72 and 73 prevent the plunger 60 from moving outward beyond the top of the inside of housing 51, and extending arms 74 and 75 prevent the plunger 61 from moving outward beyond the top of the inside of housing 52. The inward movement of the tensioner plungers 60 and 61 from the force of the chain is balanced or resisted by the frictional force created by the wedge-shaped blocks 65 and 66, and 67 and 68 pushing against the plungers 60 and 61 and the force of a return springs 70 and 71 used to push the plungers 60 and 61 away from their housings 51 and 52, respectively, as the chain tightens. Tensioner arms 110 and 111, located at the ends of the plungers 60 and 61 contact the chain to provide tension. Tensioner arm 110 contacts the tight portion, caused by torsional oscillation, of the chain, and tensioner arm 111 contacts the slack portion of the chain.

A wedge guide 100 separates the two tensioner assemblies so that they operate individually and do not contact one another. The wedge-shaped blocks 65, 66, 67, and 68 are horizontally guided along wedge guide 100 as the plungers 60 and 61 move inward or outward. In addition to the force from the wedge-shaped blocks pushing against the plunger angles, return springs 70 and 71 are used to push the plungers 60 and 61 back into their housings 51 and 52 as the chain tightens. As the chain force increases, the plungers 60 and 61 will move inward to balance the tensioner piston force and the downward force. The wedge-shaped blocks 65 and 66, and 67 and 68 will also move outward towards the outer end of their housings 51 and 52, respectively.

Figure 8:
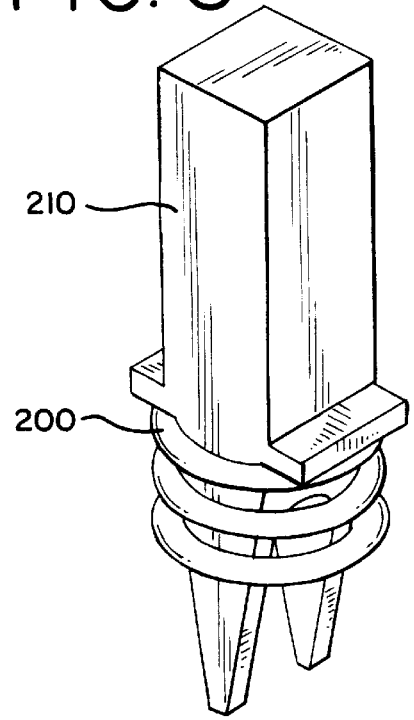
FIG. 8 is a perspective view of an alternate embodiment of the plunger with a spring at its lower end.

In a third embodiment of this invention, FIG. 8 shows a coil spring 200 located within the housing surrounding the lower part of the plunger 210. The coil spring 200 provides a high response rate for the upward force in the tensioner. In contrast, a belleville spring sustains large loads with small deflections.

Figure 9:
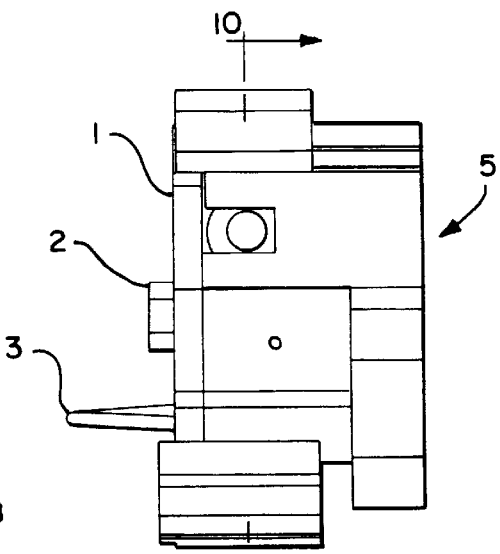
FIG. 9 is a side view of a preferred embodiment of a mechanical tensioner of the present invention.
Figure 10:
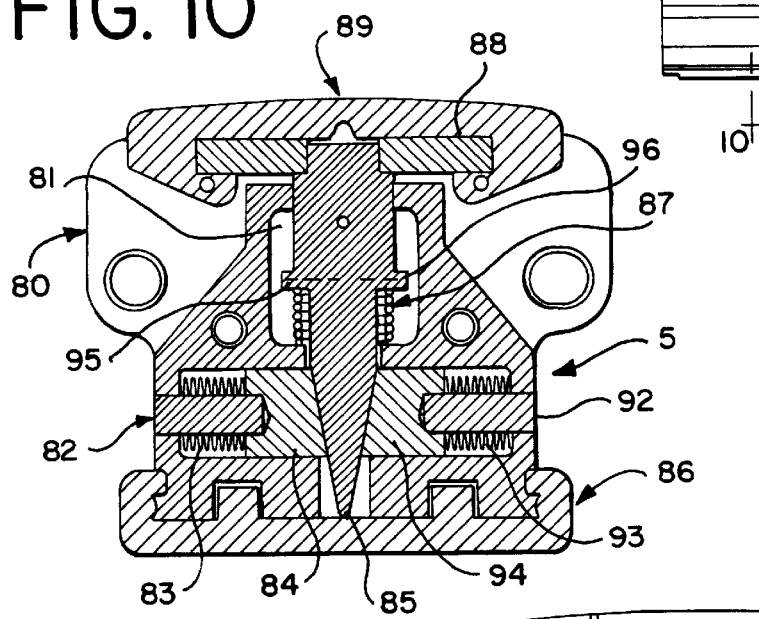
FIG. 10 is a sectional view of a preferred embodiment of a mechanical tensioner of the present invention taken along line 10—10.

FIG. 9 shows the preferred embodiment of the present invention. The tensioner 5 has a cover 1 that is attached to the tensioner by a screw 2 and a retention pin 3. FIG. 10 is a sectional view along line 10—10 of FIG. 9. Tensioner 5 includes a housing 80 having a bore 81, a snubber 86 located at the bottom of the tensioner 5, and a plunger 85 having its lower end in the shape of a wedge. At the upper end of the plunger 85 is a face plate 88 with a tensioner face 89 that contacts the chain. The lower end of plunger 85 pushes against two wedge-shaped blocks 84 and 94. The plunger 85 and wedge-shaped blocks 84 and 94 are both preferably made of powdered metal. The wedge-shaped blocks 84 and 94 are biased inward, toward one another, by rods 82 and 92 surrounded by springs 83 and 93, respectively. Stacked belleville washers may be used so that the springs 83 and 93 have a near constant force with displacement. As the plunger 85 protrudes outwardly against a chain (not shown), the wedge-shaped blocks 84 and 94 move in towards the plunger 85. Extending arms 95 and 96 prevent the plunger 85 from moving outward beyond the top of the inside of housing 80. The inward movement of the plunger 85 from the force of the chain is balanced or resisted by the frictional force created by the wedge-shaped blocks 84 and 94 pushing against the plunger 85 and the force of a return spring 87 used to push the plunger 85 away from the housing 80 as the chain tightens. Spring 87 is located below the extending arms 95 and 96.

Figure 11:
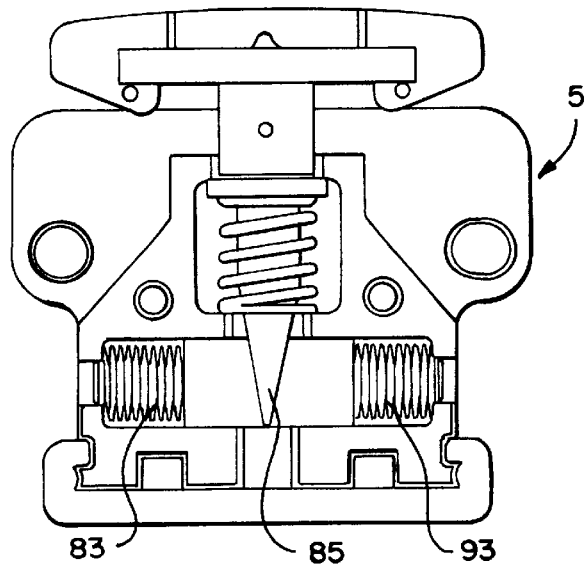
FIG. 11 is a partial sectional view of the tensioner of FIG. 10 with the plunger in an extended position.
Figure 12:
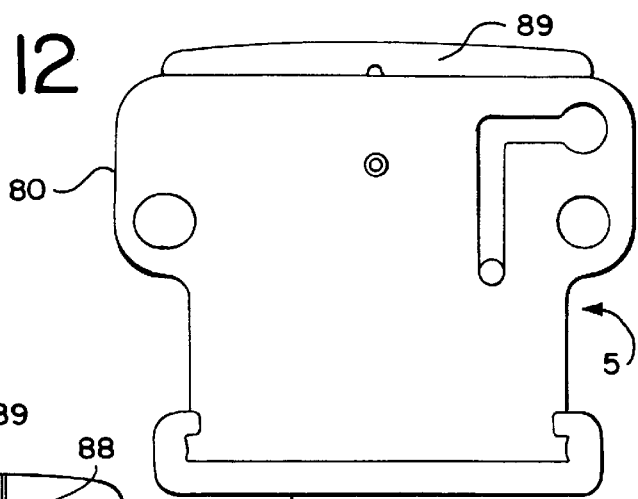
FIG. 12 is a front view of the tensioner of FIG. 10.
Figure 13:
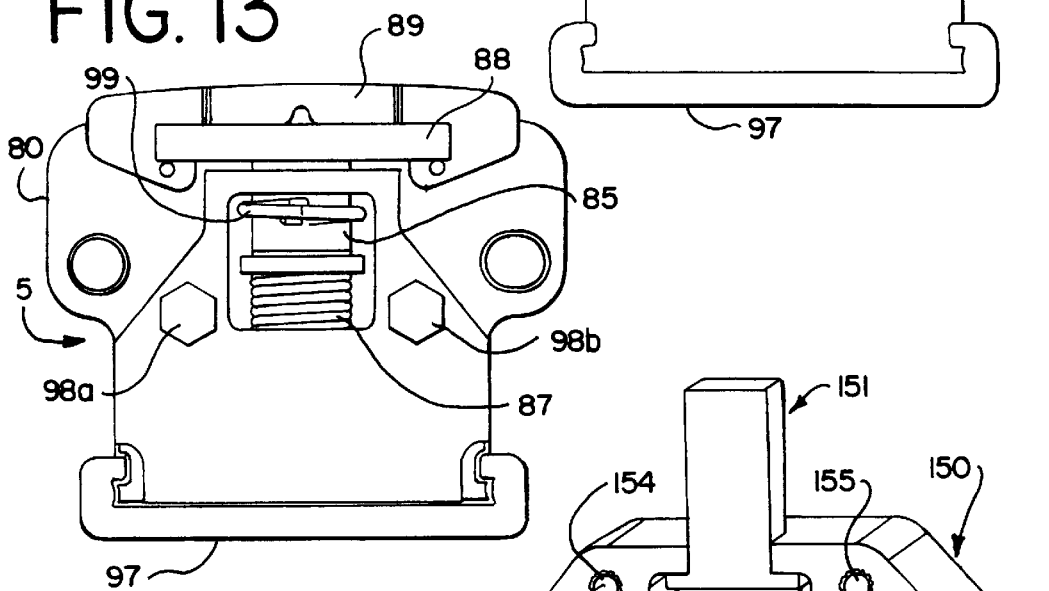
FIG. 13 is rear view of the tensioner of FIG. 10.

FIG. 11 illustrates the tensioner 5 in its outermost position when the chain is worn. The mechanical tensioner 5 maintains the plunger position with a force of 50 lbs to 175 lbs provided by the wedge springs 83 and 93 creating a friction force. This force pushes on the plunger 85 and will move the plunger 85 outward when the chain slackens to maintain an average force on the chain. FIG. 12 and FIG. 13 illustrate the back and front of the tensioner 5, respectively. More specifically, FIG. 12 illustrates housing 80, a tensioner face 89 and a snubber 97 of tensioner 5. In FIG. 13 there is a housing 80, plunger 85, spring 87, face plate 88, tensioner face 89, and retention pin 99 and screws 98a and 98b to attach the cover onto the tensioner 5.

Figure 14:
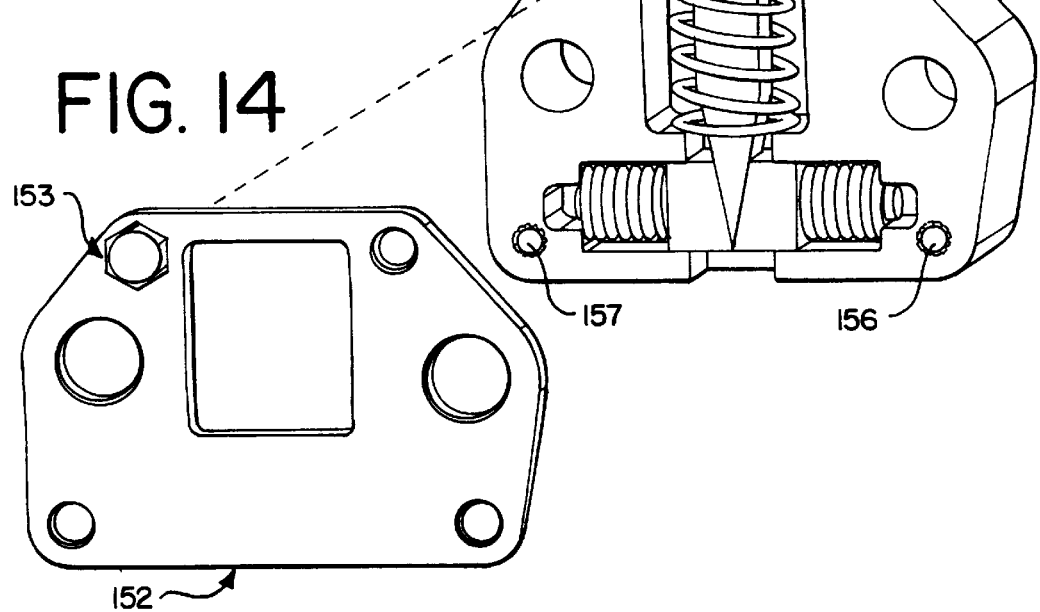
FIG. 14 is a partial sectional view of another embodiment of a mechanical tensioner of the present invention with a detached cover.

Another alternative embodiment is shown in FIG. 14, in which the mechanical tensioner has a housing 150 and a plunger 151. This embodiment operates in substantially the same manner as the embodiment of FIG. 11, but has a different configuration. A cover 152 is attached onto the tensioner with four screws, each screw is placed in holes 154, 155, 156, and 157 of the tensioner. FIG. 14 illustrates the attachment by screw 153 into hole 154.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A mechanical friction chain tensioner comprising:

a housing having an outside surface and an inside surface;

a first bore formed along a vertical centerline in said housing;

a plunger slidably received within said first bore;

at least one contacting member attached to said plunger;

a plunger return spring positioned between one of said surfaces of said housing and said contacting member, said plunger return spring biasing said plunger in a first protruding direction from said first bore along said vertical centerline;

a pair of wedge-shaped members contacting said plunger; and each of a pair of wedge springs positioned between said inside housing surface and each of said pair of wedge-shaded members, each of said pair of wedge springs biasing each of corresponding said wedge-shaped members in a horizontal direction against said plunger.

2. The chain tensioner of claim 1 wherein said plunger has a plurality of inclined portions, each of said wedge-shaped members contacting each of said corresponding plunger inclined portions.

3. The chain tensioner of claim 2 wherein each of said wedge-shaped members has an inclined portion contacting a corresponding inclined portion of said plunger.

4. The chain tensioner of claim 3 wherein said wedge-shaped members are translatable in a horizontal direction perpendicular to said vertical centerline of said first bore.

5. The chain tensioner of claim 1 wherein said wedge springs comprise stacked belleville springs.

6. The chain tensioner of claim 1 wherein said plunger includes a pair of laterally extending arms, said laterally extending arms contacting said wedge-shaped members at a position of maximum retraction of said plunger.

7. The chain tensioner of claim 1 wherein said contacting member comprises a pair of laterally extending arms that extend from said plunger, said plunger return spring is located between said laterally extending arms and said wedge-shaped members.

8. The chain tensioner of claim 1 wherein said housing includes a second bore opposite from said first bore along said vertical centerline, said second bore including a second plunger protruding from said second bore in a second protruding direction along said vertical centerline opposite said first protruding direction of said first plunger.

9. The chain tensioner of claim 8 further comprising:

a second pair of wedge-shaped members and a second pair of wedge spring members associated therewith, wherein said second plunger is biased in a second protruding direction by said second pair of wedge-shaped members, each of said second pair of wedge-shaped members being biased against said second plunger by a corresponding one of said second pair of wedge spring members.

10. The chain tensioner of claim 1 wherein said tensioner housing includes a lower end and an upper end, said plunder having an upper end, a snubber, said snubber being located at said lower end of said tensioner housing;

and a face plate, said face plate being located at the upper end of the plunger and contacting an associated chain.

11. The chain tensioner of claim 10 wherein the plunger return spring is located within the first bore against said inside surface of said housing.

12. The chain tensioner of claim 1 wherein said plunger return spring is located against said outside surface of the housing.

* * * * *